United States Patent Office 3,501,707
Patented Mar. 17, 1970

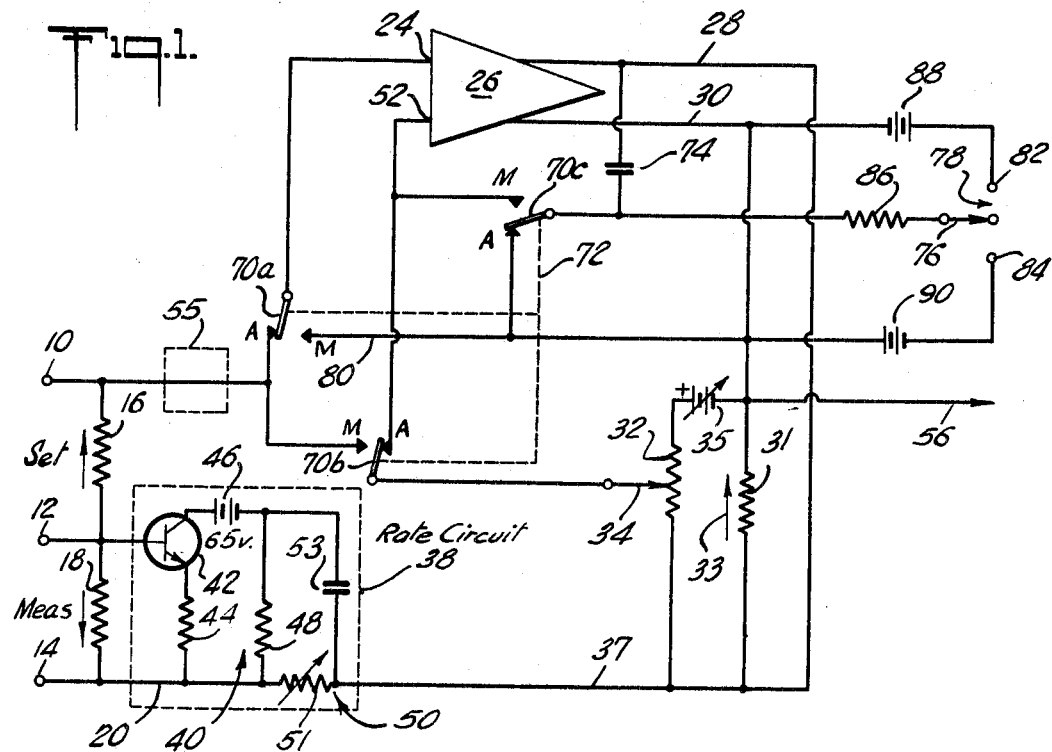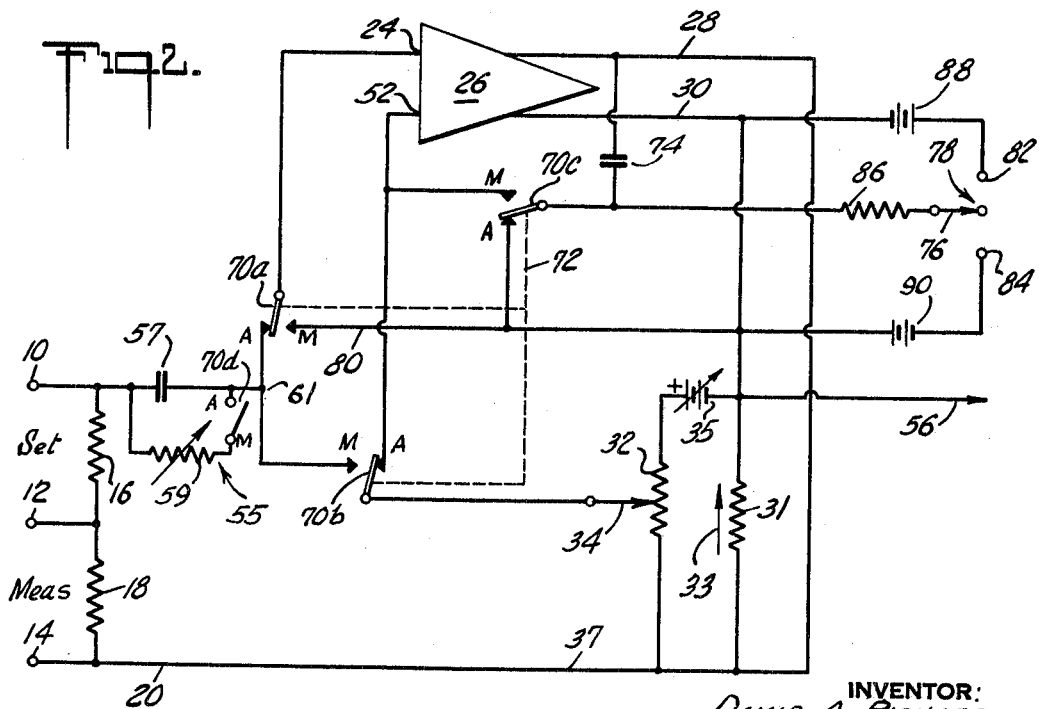

3,501,707
ELECTRONIC CONTROL APPARATUS HAVING IMPROVED MEANS FOR TRANSFER BETWEEN AUTOMATIC AND MANUAL OPERATION
David A. Richardson, Sheldonville, Mass., assignor to The Foxboro Company, Foxboro, Mass.
Filed Feb. 27, 1967, Ser. No. 618,715
Int. Cl. H03f 1/02
U.S. Cl. 330—9        7 Claims

ABSTRACT OF THE DISCLOSURE

Industrial process controller in which transfer in both directions between automatic and manual operation of the controller is accomplished without upsets in the process, and without any need for balancing the controller prior to transfer. The controller embodiments disclosed are of the non-reset type, and use a "memory" storage circuit to sense and compensate for signal imbalances during transfer.

---

This invention relates to control apparatus for use in regulating a variable condition of an industrial process. More particularly, this invention relates to electronic control apparatus of the type adapted to receive an electrical measurement signal and to produce a corresponding electrical control signal for transmission to a process regulating device such as a valve or the like.

Electronic process controllers of the so-called "analog" type have been available and in use commercially for a number of years. One particularly successful design is disclosed in U.S. Patent No. 2,956,234, issued to E. O. Olsen on Oct. 11, 1960. An important advantage of such prior controllers is that they are constructed of modern "solid state" components comprising transistors and other elements made of semiconducting material, and thus not only provide excellent control characteristics but are able to operate reliably for long periods of time.

Although such controllers generally operate automatically to maintain a process condition at a desired level, there are times when it is necessary to switch the controller from automatic to non-automatic operation. Devising suitable means for making the transfer from automatic to non-automatic operation, and back again, has represented a problem. For example, special arrangements must be provided for assuring that the transfer takes place without upsetting the process. Effective means for "bumpless" automatic transfer in one direction is shown in U.S. Patent 3,246,250 to A. Nazareth, Jr., assigned to the same assignee as the present application. A controller providing bumpless transfer from automatic to manual operation is shown in the U.S. patent application of David A. Richardson and Everett O. Olsen, Ser. No. 507,780, filed on Nov. 15, 1965, also assigned to the same assignee as the present application. The controller shown in that latter application also includes an improved manual-to-automatic transfer arrangement which is specially suited for use with three-mode controllers, i.e. controllers having reset, rate and proportioning functions.

It is a principal object of this invention to provide process control apparatus of the non-reset type with improved means for transferring between automatic and non-automatic conditions of operation. In embodiments of this invention described hereinbelow, process controllers of the non-reset type are disclosed having means for switching directly between automatic and non-automatic conditions, in either direction, and without upsetting the process. Other objects, aspects and advantages of this invention will in part be pointed out in, and in part be apparent from, the following description considered together with the acompanying drawings, in which:

FIGURE 1 is a schematic diagram illustrating one non-reset process controller incorporating the transfer switch arrangement of the present invention; and
FIGURE 2 is a schematic diagram of another embodiment of the invention.

Referring now to the left-hand side of FIGURE 1, there are shown three input terminals 10, 12 and 14 leading to two series-connected resistors 16 and 18. Through the circuit loop including terminals 10 and 12 and resistor 16 (500 ohms) flows a "set-point" current of adjustable but normally fixed magnitude, for example in the range of 2 to 10 milliamps. Through the other circuit loop including terminals 12 and 14 and resistor 18 (100 ohms) flows a measurement current, e.g. in the range of 10 to 50 milliamps, and having a magnitude proportional to the value of the controlled process condition. These two currents flow in opposite directions, as shown by the arrows. Thus, the voltages produced across the resistors 16 and 18 are of opposite polarity.

The circuitry described thus far comprises comparison circuit means arranged to produce between terminals 10 and 14 a deviation signal having a magnitude proportional to the difference between the desired and actual values of the process condition, and having a polarity determined by whether the condition is above or below the desired value. When the measured process condition is exactly at its desired value, i.e. on "set point," the deviation signal will be zero. If the measurement current through resistor 18 changes, the potential of terminal 10 will change correspondingly with respect to that of terminal 14. Simply to provide a base of reference for the various circuit potentials in the controller, terminal 14 will be considered the "circuit ground," and the lead 20 connected thereto will be termed the "reference lead." If the set point current through resistor 16 is adjusted to its mid-value (6 milliamps), the deviation signal at terminal 10 can be at any potential from minus 2 volts to plus 2 volts with respect to reference lead 20, the exact value depending, of course, upon the measured process condition.

The process controller shown in FIGURE 1 includes an automatic-to-manual transfer switch 72 with three sections, 70a, 70b and 70c. Each switch section is shown in the "A" or automatic position; i.e., in the position in which the controller automatically varies its output signal in accordance with the input deviation signal. With the switch 72 thus in the automatic position, the deviation signal on terminal 10 is directed through section 70a of switch 72 to one input terminal 24 of a high-gain A-C amplifier generally indicated at 26.

Amplifier 26 is described in greater detail in the above-identified Richardson and Olsen application, the disclosure of which hereby is incorporated into this application. Amplifier 26 typically has a forward gain of 2,000. The output leads 28 and 30 of this amplifier are connected respectively to the ends of a 600 ohm resistor 31, the lower end of which is connected to the lower end of a proportioning-band adjustment potentiometer 32 (about 10K) which also is connected to the reference lead 20. A regulated, variable-voltage D.C. bias source 35 is connected between the upper ends of resistor 31 and potentiometer 32. The movable arm or "wiper" 34 of potentiometer 32 defines an output terminal 34 of a feedback circuit providing a negative feedback voltage between output terminals 34 and 37. Terminal 34 is connected to the amplifier input terminal 52 by switch section 70b. The current flow through resistor 31 is in the direction of the arrow 33 so that the potential at the top of resistor 31 is negative with respect to the reference lead 20.

The ohmic resistance of resistor 31 is selected to set the feedback voltage at the desired level and in the preferred embodiment provides a 300% proportioning band with 5 to 25 ma. feedback current. The voltage of bias source 35 is set to a value such that it bucks out the voltage developed across potentiometer 32 at the midpoint of the feedback voltage range, thus providing zero input voltage to the amplifier 26 when the deviation signal is zero.

A "rate" or "derivative" circuit 38 is provided in order to give the controller an output signal varying in accordance with the rate at which the measurement signal is changing.

The rate circuit 38 includes a transistor amplifier indicated generally at 40 which incorporates a transistor 42, an emitter resistor 44 connected between the emitter of transistor 42 and the reference line 20, an operating D-C power source 46, and a load resistor 48 having a relatively low resistance (e.g., 10,000 ohms). The measurement voltage is amplified by amplifier 40 and appears across load resistor 48, at which point it is applied to an R-C circuit 50 comprising a 100 megohm variable resistor 51 and a capacitor 53. The "rate" signal appears across resistor 51 and thus adds a rate-responsive voltage component to the input signal to the amplifier 26.

The potential difference between the two amplifier input terminals 24 and 52 determines the magnitude of current flowing through output leads 28 and 30. Typically, when the potential difference between the input terminals is zero, the output current is adjusted to be at its midrange value, e.g. having a magnitude sufficient to create a drop of 9 volts across the resistor 31. As the amplifier output swings through its full range, the drop across this resistor varies from 3 to 15 volts. An increase in potential of the amplifier input terminal 24 causes the current flow through resistor 31 to decrease, and vice-versa. The full range of output variation is obtained by a change in input voltage of about one millivolt.

The operation of the FIGURE 1 circuitry with the switch 72 in the "automatic" position is as follows: Assuming first that the deviation signal at terminal 10 is zero, and that all of the circuit potentials are stabilized, an increase in the measurement current through resistor 18 will create a positive deviation signal at terminal 10, and this will tend to raise the potential of amplifier input terminal 24. The output current flowing through resistor 31 thus will decrease to cause the potential on output terminal 34 to become more positive.

As an exaggerated example, if the measurement current through resistor 18 increases suddenly by 10 milliamps (e.g. from 30 to 40 milliamps), the potential of deviation terminal 10 would go positive one volt. Assuming now that the potential of the output terminal 34 was zero volts initially, and that rate circuit 38 is temporarily disabled, the one volt increase in the deviation signal will cause the potential of feedback circuit output terminal 34 to shift one volt positive to keep the potential difference between input terminals 24 and 52 at zero. Of course, it is not possible to hold the input voltage exactly at zero, because there must be a change in the input voltage in order to produce the decreased amplifier output current required to shift the output potential at terminal 34 one volt. However, the amplifier gain is so high that this change in input voltage is essentially negligible relative to the change in deviation signal and feedback voltage.

The amplifier 26 includes in its output a control signal circuit 56 which is symbolically indicated in FIGURE 1 as a single conductor connected to the upper terminal of resistor 31. This circuit is adapted to transmit to a remote process regulating device, such as a valve or the like (not shown), a control signal corresponding to the current through resistor 31. In the actual controller, as is shown in detail in the above-identified Richardson and Olsen application, this circuit 56 is somewhat more complex than that shown in FIGURE 1, but in essence it acts in a conventional manner to produce an output control signal in the range of 10-50 milliamps, whereas the current flowing through resistor 31 is in the range of 5-25 milliamps.

The above discussion was based on the simplifying assumption that rate circuit 38 was disabled. In actual operation, this circuit will develop across resistor 51 a voltage tending to augment the increase in the measurement signal and having a magnitude proportional to the rate-of-change of the measurement signal. For example, the rate signal across resistor 51 might be one volt, initially, so that the net input signal to the amplifier is two volts. Thus, the feedback voltage between feedback output terminals 34 and 35 will initially be 2 volts (positive). After this initial effect, the rate of charge of capacitor 53 will diminish, so that the rate responsive component similarly will diminish, thus causing the feedback voltage also to drop back.

The charging of rate capacitor 53 is at a relatively low rate, because of the relatively large time-constant of rate resistor 51 and capacitor 53. For example, capacitor 53 preferably has a capacitance of from 1.8 to 18 microfarads. Thus, even at the smallest setting of resistor 51, the time constant is relatively large, e.g., over 1 second.

The initial change in the control signal in circuit 56 produces a corresponding change in the setting of the process regulating device, and this in turn causes the controlled process condition to start back to the desired set point. Thus, the deviation signal at terminal 10 will correspondingly be reduced. These various influences in the circuitry interact in a dynamic fashion, and produce as an end result a proper control action effective to stabilize the controlled process condition at the desired level with reasonable speed and minimum overshoot.

TRANSFER TO MANUAL OPERATION

While the controller is operating automatically to regulate the process condition described above, the value of the control signal at all times is furnished to a memory circuit comprising a memory capacitor 74 suited for holding a charge for relatively long periods of time. Specifically, one plate of this capacitor is connected through section 70c of transfer switch 72 to the lower output lead 30, while the other plate is connected to the upper output lead 28 (itself connected to reference lead 20). To put it another way, capacitor 74 is connected directly across resistor 31. Thus, capacitor 74 is maintained charged to a level corresponding to the output of the controller; specifically, the potential of its lower plate is held equal to the negative potential at the top of resistor 31.

When the transfer switch 72 is shifted to its nonautomatic position (referred to herein as the "manual" position), the lower plate of memory capacitor 74 is connected by switch section 70c directly to amplifier input terminal 52. Simultaneously, switch section 70a connects the other input terminal 24 through a return lead 80 to amplifier output lead 30 (i.e. the upper end of resistor 31). Since at the instant prior to switchover this output lead 30 was at the same potential as the lower plate of memory capacitor 74, at the instant after switchover the two input terminals 24 and 52 will be at essentially the same potential, i.e. the amplifier input voltage will be essentially zero. Thereafter, the input voltage will of course change slightly (e.g. a fraction of a millivolt), due to the feedback action of lead 80 which causes the amplifier output to be held at that value providing a match between the potential of output lead 30 and the potential applied to amplifier input terminal 52 by memory capacitor 74. The amplifier output thus will be maintained essentially constant during and immediately after switchover to "manual" operation, and accordingly the process will not experience any upset due to switching.

It also should be noted that after switchover and while on "manual" operation, the memory capacitor 74 is connected between the output and the input of the amplifier 26. Thus, the feedback action provided by this amplifier tends to hold the capacitor charged to its original level, thereby minimizing drift effects.

To change the output current of the controller, it is only necessary to alter the charge stored on the memory capacitor 74. The feedback action of lead 80 will automatically change the output of amplifier 26 correspondingly. In this embodiment of the invention, the capacitor charge is altered by operating the movable arm 76 of a switch 78 to either of two positions 82 or 84.

In position 82, switch 78 connects the amplifier input terminals 24 and 52 to a series circuit consisting of a current-limiting resistor 86 and a D-C voltage source 88. This tends to make terminal 24 more negative, and by feedback action the memory capacitor 74 gradually charges at a rate determined by the time-constant of the circuit comprising capacitor 74 (2 microfarads) and the current-limiting resistor 86 (10M). As long as switch 78 is held in position 82, capacitor 74 will charge at a substantially constant slow rate, and the output of the controller correspondingly will increase.

If the switch 78 is shifted to its other position 84, the controller output will decrease at a substantially constant slow rate. The output will decrease because in this switch position, source 90 is connected in the circuit in place of source 88, and source 90 has a reverse polarity with respect to source 88.

When the switch 78 is returned to its neutral (center) position, the voltage sources 88 and 90 are isolated from the amplifier circuitry. Thus, the charging (or discharging) of memory capacitor 74 will immediately cease, and the output of the controller will remain constant at a level reflecting the amount of charge then stored on the capacitor. The feedback action of the amplifier will hold the output closely to its set level and will minimize any drift effects resulting from capacitor leakage.

SWITCHBACK TO AUTOMATIC OPERATION

During the time the controller is on manual operation, section 70b of transfer switch 72 connects the feedback circuit output terminal 34 directly to the input terminal 10. In this condition the voltage across the rate resistor 51 continuously reflects the difference between the deviation signal (on terminal 10) and the manually-set controller output signal (represented by the potential of output terminal 34). During manual operation of the controller, there is a closed loop including the set point and measurement voltage sources in series with the feedback circuit output terminals 34 and 37 providing a voltage corresponding to the output of the controller amplifier. Thus, any change in either the deviation or output voltages immediately causes a corresponding change in the voltage drop across the resistor 51.

The voltage across resistor 51 also is applied to the series R-C circuit comprising the load resistor 48 and the capacitor 53. The resistance of resistor 48 is only about 10K ohms. Thus, the time constant of the R-C circuit comprising resistor 48 and capacitor 53 is relatively low (e.g., of the order of 0.1 second), so that the capacitor 53 relatively quickly charges or discharges to a new level reflecting the voltage appearing on the resistor 51.

Upon switchback to automatic operation, the closed loop is opened between input terminal 10 and feedback circuit output terminal 34. After switchback, the charge on capacitor 53 will not change extremely rapidly because the time constant of the discharge path is relatively high due to the fact that it includes the large resistor 51. Thus, the capacitor 53 serves, in effect, as a memory device to remember the actual status of the process condition relative to its set point, and the relationship of that status to the actual manually-adjusted output of the controller.

When the transfer switch 72 is returned to its automatic position, there will be, at the instant following switchback, essentially no potential difference between the amplifier input terminals 24 and 52, because the circuit points now connected to these terminals (points 10 and 34) were, before switchback, connected directly together by transfer switch section 70b. Since the charge on the rate capacitor 53 had, during manual operation, been maintained at the proper value reflecting both the deviation signal and the controller output signal, this rate capacitor charge will prevent any immediate significant change in the amplifier input signal after switchback to automatic operation. Thus, switchback will take place without any significant change in the controller output signal.

It is particularly notable that, with the rate circuit 38 of this embodiment of the invention, the transfer back to automatic operation will be smooth even though the process condition in changing at the time of switchback. Under these conditions the changing of the process condition will be reflected by a corresponding rate signal from amplifier 40. However, this rate signal is connected in series with the deviation signal both before and after switchback, and thus it has no effect on the input to the main amplifier 26 at the instant of switchback. Thereafter, of course, the rate signal will have its intended effect in providing proper automatic control of the process condition.

The embodiment shown in FIGURE 2 is identical to that shown in FIGURE 1 except that the rate circuit 38 has been replaced by a memory circuit 55. The controller illustrated in FIGURE 2 thus does not have rate or derivative action, but has only a "proportioning" action provided by potentiometer 32.

The memory circuit 55 includes a capacitor 57 connected in series with the input lead connected to amplifier terminal 24. A variable resistor 59 is connected in parallel with capacitor 57 by means of section 70d of the transfer switch 72 during "automatic" operation of the controller. Thus, during automatic operation, resistor 59 provides a bypass for the flow of direct current through lead 24, and discharges any charge appearing on the capacitor 57. Resistor 59 typically has a resistance range of from 50K ohms to 2 megohms, values substantially lower than the input impedance of amplifier 26 (around 2000 megohms) and substantially greater than the relatively low resistance (100 to 500 ohms) of resistors 16 and 18.

Upon transfer of switch 72 to the "manual" position, the parallel connection of resistor 59 to capacitor 57 is broken, and capacitor 57 remains connected in series with the deviation signal and a signal proportional to the output signal of the controller amplifier. During manual operation, the capacitor 57 charges up to a voltage value reflecting the difference between these signals and thus serves to remember this difference after switchback to automatic. As in the FIGURE 1 embodiment, during manual operation, the points which are to be connected to the amplifier input leads 24 and 52 during automatic operation (points 61 and 34) are connected together so that there will be no voltage applied between leads 24 and 52 upon switchback to automatic operation. Thus, there will be no upset or "bump" in the controller operation.

In some uses of the controller shown in FIGURE 1, it may be desirable to provide a memory circuit 55 to supplement the bumpless, balanceless transfer operation of the rate circuit 38. This is true, for example, in cases where the minimum resistance of the variable resistor 51 is relatively low. In such a case, the transfer mode time constant of the rate circuit may be rendered so low that, with some processes, a "bump" would be experienced during transfer but for the addition of the memory circuit 55, as shown in dashed lines in FIGURE 1. Hence, incorporation of circuit 55 provides an additional margin of safety against "bumps" in the transfer.

I claim:

1. Process control apparatus for developing a control signal to control a process valve or the like and comprising measurement signal means producing a measurement signal corresponding to a measured process condition, set signal means producing a set signal corresponding to the desired level of said process condition, comparison circuit means interconnecting said measurement and set signal means to develop a deviation signal indicating by its magnitude the difference between said measurement and set signals; an amplifier having an input and an output and adapted to produce an output control signal; feedback means developing a feedback signal for said amplifier input; rate-responsive means coupled to said measurement signal means to produce a rate signal corresponding to the rate of change of the process condition; said rate-responsive means comprising a resistor connected in series with said coupling circuit and a capacitor connected at one of its ends to one end of said resistor, said measurement signal being applied between the other ends of said resistor and said capacitor; transfer switch means having first and second positions; said transfer switch means in said first position serving to connect in series to said amplifier input the following: (1) the deviation signal at said comparison circuit, (2) the rate-responsive signal across said resistor, and (3) the feedback signal of said feedback means; said transfer switch means serving in said second position to isolate said amplifier input from the deviation, rate-responsive and feedback signals; said transfer switch means also serving in said second position to connect said rate-responsive means resistor in series with said feedback signal and said deviation signal to produce across said resistor a voltage to maintain siad rate capacitor charged to a level proportional to the algebraic summation of said deviation signal and the feedback signal.

2. Process control apparatus for developing a control signal to control a process valve or the like and comprising measurement signal means producing a signal corresponding to a measured process condition, set signal means producing a set signal corresponding to the desired level of said process condition, comparison circuit means interconnecting said measurement and set signal means and having a pair of output terminals on which appears a deviation signal; an amplifier having a high-impedance input circuit and an output circuit adapted to produce an output control signal; feedback means coupled to said amplifier output circuit and having a pair of feedback terminals for developing a feedback signal for said amplifier input; a memory storage circuit having a pair of connecting terminals and capacitor means connected between said connecting terminals to store an electrical charge representing an applied signal level;

transfer switch means having first and second positions;

said transfer switch means serving in said first position to connect in series with said amplifier input the following: (1) the ouput terminals of said comparison circuit, (2) the connecting terminals of said memory storage circuit, and (3) the feedback terminals of said feedback means;

a resistor connected across said capacitor means when said transfer switch is in said first position;

said transfer switch means serving in said second position to isolate said amplifier input from said comparison circuit, said feedback means and said memory storage circuit; said transfer switch means also serving in said second position to make effective a circuit means connecting said connecting terminals of said memory storage circuit in series with said feedback terminals and said comparison circuit output terminals through a low-resistance path so as to maintain said capacitor means charged to a level having a component proportional to the algebraic summation of the deviation signal and the feedback signal, the resistance of said circuit means being sufficiently low to insure that the charge on said capacitor means follows faithfully any changes in the level of said deviation or feedback signals;

said resistor connected across said capacitor means having an ohmic resistance higher than said low-resistance path of said connecting circuit means but sufficiently low to discharge said proportional charge component of the capacitor means in a relatively short time after said transfer switch is shifted from said second position to said first position, the value of resistance of said resistor being selected to provide a discharge rate which minimizes any sudden upset to the controlled process condition.

3. Apparatus as claimed in claim 2, wherein said transfer switch means includes switch elements operative in said first position to connect said resistor in parallel with said storage capacitor to provide a by-pass for the flow of direct current and to drain off any charge appearing on said capacitor, said resistor having an ohmic resistance substantially less than the input impedance of said amplifier, said switch elements being operative in said second position to disconnect one end of said resistor from one end of said capacitor, whereby in said second position said resistor has no effect on the charging or discharging current of said capacitor.

4. Apparatus as claimed in claim 3, including a rate circuit having a rate resistor and a rate capacitor, said rate resistor being connected between said comparison circuit means and said feedback means to produce an additional signal component to be applied to the amplifier input when said transfer switch is in said first position, said rate capacitor having one end connected to one end of said rate resistor and its other end coupled to said measurement signal means to produce across said rate resistor a signal component responsive to the rate of change of the measurement signal.

5. Apparatus as claimed in claim 4, including a second amplifier coupling said measurement signal means to said other end of said rate capacitor.

6. Apparatus as claimed in claim 2, wherein said resistor is connected between said memory circuit connecting terminals, one end of said capacitor being coupled to one end of said resistor and the other end of said capacitor being coupled to said measurement signal means, to produce a flow of current through said resistor responsive to the rate of change of said measurement signal.

7. Apparatus as claimed in claim 6, including a second amplifier to couple said other capacitor end to said measurement signal means, said amplifier having a load resistor of ohmic resistance substantially less than that of the first mentioned resistor, said load resistor being connected between the other end of said capacitor and the other end of said first resistor and serving as part of the low-resistance connecting circuit means when said transfer switch is in said second poition.

References Cited

UNITED STATES PATENTS 3,246,250  4/1966  Nazareth _____ 330—10
3,290,563  12/1966  Hyer et al. _____ 317—231

NATHAN KAUFMAN, Primary Examiner

U.S. Cl. X.R.

230—12; 330—5, 76